(12) United States Patent
Moreau

(10) Patent No.: US 7,664,948 B2
(45) Date of Patent: Feb. 16, 2010

(54) CERTIFICATE LOOKUP AND VALIDATION

(75) Inventor: Thomas O. Moreau, Candia, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 1041 days.

(21) Appl. No.: 11/125,576

(22) Filed: May 10, 2005

(65) Prior Publication Data

US 2005/0262345 A1 Nov. 24, 2005

Related U.S. Application Data

(60) Provisional application No. 60/573,276, filed on May 21, 2004.

(51) Int. Cl.
*G06F 9/00* (2006.01)

(52) U.S. Cl. ...................................... 713/156; 713/193
(58) Field of Classification Search ................. 713/156, 713/193
See application file for complete search history.

(56) References Cited

U.S. PATENT DOCUMENTS 4,652,698 A * 3/1987 Hale et al. ................... 713/155
4,897,781 A * 1/1990 Chang et al. ................. 707/201

* cited by examiner

*Primary Examiner*—Thomas Peeso
(74) *Attorney, Agent, or Firm*—Fliesler Meyer LLP

(57) ABSTRACT

A certificate validation framework allows for the use of plug-ins for a certificate path builder and certificate path validator. Clients can include a web server clients, SSL certificate validation or application code.

17 Claims, 2 Drawing Sheets

CERTIFICATE LOOKUP AND VALIDATION

CLAIM OF PRIORITY

This application claims priority to U.S. Provisional Application No. 60/573,276 entitled "Certificate Lookup and Validation" filed May 21, 2004.

BACKGROUND OF INVENTION

Public key infrastructure (PKI) supports a number of security measures including data security, company confidentiality, and entity authentication. The PKI services relate to the proper use of public/private key pairs. The Public component of the key pair is issued in the form of a public key certificate and associated with appropriate to cryptographic algorithms is used to verify digital signature, encrypt data or the like.

Before a certificate can be used, it must be validated. In order to validate a certificate, a chain of certificates or certification path between the certificate and an established point of trust must be established, and every certificate in the path must be checked. This process is referred to as certification path processing.

Certification path processing includes path construction or certificate lookup, and path validation. Path construction includes building one or more candidate certification paths. Path validation includes making sure that each certificate in the path is within the established validity period, hasn't been revoked and has integrity. An example of a certificate chain is the X.509 certificate chain. Typically, the certificate chain includes a root certificate signed by itself, the next certificate signed by the root certificate and so on until the final certificate signed by the next to the last certificate.

A Java Application Programming Interface (API) for implementing lookup and validation of X.509 certificate chains is the CertPath API which is a part of the Java Development Kit (JDK) available from Sun Microsystems of Santa Clara, Calif.

DETAILED DESCRIPTION

Figure 1:
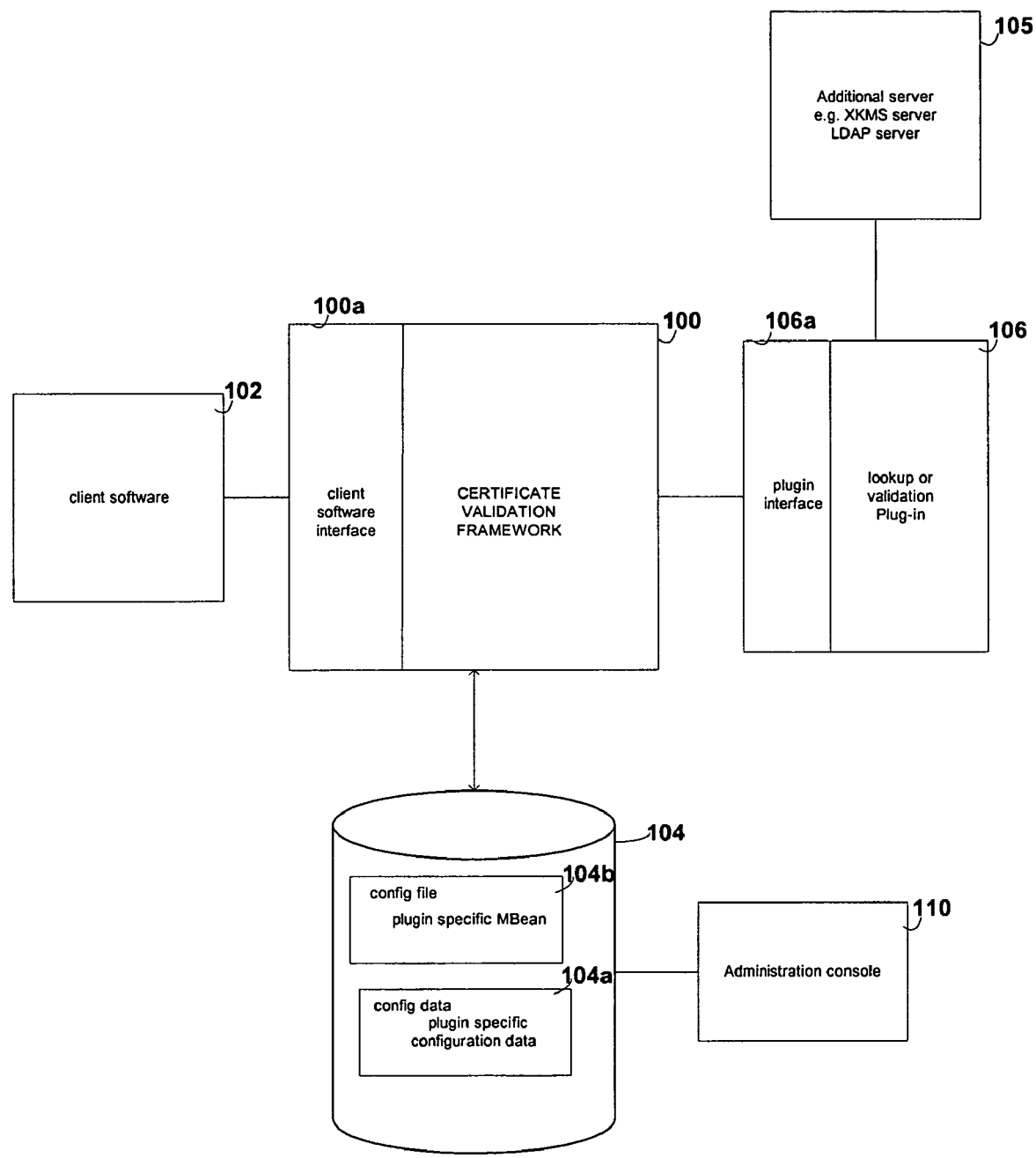
FIG. 1 is a diagram that illustrates one embodiment of a certificate validation framework of one embodiment of the present invention.

FIG. 1 shows a certificate validation framework 100. The certificate validation framework 100, in one embodiment, can allow client software, such as a client software 102 to do a certificate lookup and validation. In one embodiment, the certificate validation framework 100 does not require the client software 102 to provide plugin specific configuration data such as server location information ( i.e. for the additional servers 105). The JDK/API for a certificate path builder requires plugin specific information, such as the locations of the server including an XML Key Management Specification (XKMS) server or a Uniform Resource Locator (URL) for a Lightweight Directory Access Protocol (LDAP) server host and port network. The certificate validation framework 100 can store plugin specific configuration data in memory 104.

In one embodiment, the certificate validation framework 100 includes a client software interface 100a for receiving a request from the framework 100 can interact with a lookup or validation plug-in 106, which includes a plug-in interface 106a. In one embodiment, the certificate validation framework 100 interacts with a lookup or validation plug-in 106 to do the certificate lookup or validation. The plug-ins can also be called providers. The certificate validation framework 100 can provide information from the client software 102 as well as the stored plugin specific configuration data from the memory 104 to the lookup or validation plug-in 106. By using plug-ins to connect to the certificate validation framework, the client software 102 can be isolated from certain information such as the server location information. The plug-in 106 can define the plug-in interface 106a with respect to the certificate validation framework 100 to indicate the required information. In one embodiment, the plug-in interface includes the transfer of a management object, such as an MBean, from the plug-in 106 to indicate the information required by the lookup or validation plug-in 106. This information can be stored in the memory 104.

The MBean can indicate stored plugin specific configuration data such as server location. The plugin specific configuration data such as server location can be provided by the plug-ins supplied by the validation framework or input by a user or administrator.

In one embodiment, the configuration file 104b holds a plugin specific MBean which refers to configuration data 104a. At runtime, the plugin 106 can use the plugin specific MBean 104b to retrieve its configuration data 104a.

In one embodiment, the certificate validation framework 100 can be part of a server product, such as the WebLogic Server™ of BEA Systems, Inc., of San Jose, Calif.

In one embodiment, the plug-in 106 is a certificate path builder plug-in or a certificate path validator plug-in. In one embodiment, both a certificate path builder plug-in and certificate path validator plug-in can be connected to the certificate validation framework 100. The client software 102 can be, but is not limited to, a web server client certificate validation program, a secure socket layer (SSL) certificate validation program or application code.

In one embodiment, an MBean stores the plugin specific configuration data in a configuration file in the memory 104 of the system. In that way, the certificate validation framework 100 can isolate the client software 102 from needing to provide certain configuration information, such as such as server location information. The configuration information which can be provided by the plug-ins, set as a default by the validation framework 100 or input by user through an administration console 110. The plug-in interface 106a for the runtime can be defined with a management object such as an MBean, which indicates which information is required. For example, the MBean can indicate an LDAP server URL or an XKMS server location.

A CLV certpath model has a number of advantages over the over the JDK certpath model. The CLV model can move the responsibility for selecting the lookup and validation "quality of service" (ie. which plugins to use) and specifying the plugins' configuration data (e.g. XKMS server's host & port) from the client to the administrator. In one embodiment the JDK certpath and CLV certpath models are:

JDK model
    plugin writer
        by nature, the plugin has a certain "quality of service"
            e.g. looks up & validates cert paths by using an XKMS server
        configuration data
            defines what configuration data it requires
                e.g. XKMS server host & port typically, the plugin defines a plugin-specific proprietary client configuration API lookup & validation criteria
  defines what criteria it supports for locating & validating cert paths
    e.g. find cert path given the end certificdate's subject dn
  defines the api for specifing the criteria
    e.g. uses a standard JDK client certpath api (e.g. X509CertSelector)
    e.g. defines a plugin specific proprietary client API
implements the JDK certpath SPIs
administrator
plugin installation
  installs the plugin's code on the machine
quality of service
  the administrator does not decide the quality of service (ie. which plugins to use).
    instead, each client must decide the quality of service
plugin configuration
  the adminstrator does not configure the plugins' configuration data (e.g. XKMS server host & port).
    instead, each client must store the plugins' configuration data
client
quality of service
  chooses which of the available plugins to use—ie. chooses lookup & validation quality of service
    v.s. the administrator setting up one set of lookup & validation rules for all client
plugin configuration
  the client must be aware of the plugin's configuration strategy
  typically the client must persistently store the plugin's configuration data (e.g. XKMS server & port)
    vs. the adminstrator configuring the plugins' configuration data once
  typically the client must use the plugin's proprietary configuration API
lookup & validation criteria
  the client must be aware of the plugin's lookup & validation criteria strategy
  the client may be required to use a JDK api to specify the criteria (e.g. X509CertPathSelector)
  the client may be required to the the plugin's proprietary lookup & validation criteria api
must be re-coded to take advantage of new plugin implementations
uses JDK certpath and plugin specific proprietary apis CLV model
  plugin writer
  by nature, the plugin has a certain "quality of service"
    e.g. looks up & validates cert paths by using an XKMS server
  configuration data
    defines what configuration data it requires
      e.g. XKMS server host & port
    using WLS tools, defines a proprietary MBean api for specifying its configuration data
  lookup & validation criteria
    decides which of the WLS defined standard criteria for locating and validating cert paths it supports
      e.g. find cert path given the end certificdate's subject dn
  implements the JDK certpath SPIs AND the WLS CLV SPIs
  symmetrical with writing other WLS security plugins (e.g. for authentication/authorization)
administrator
plugin installation
  installs the plugin's code on the machines, using WLS mechanisms
quality of service
  chooses which of the available plugins to use—the lookup & validation quality of service
  this qualify of service is used for all clients
    v.s. each client selecting the quality of service
  typically uses the WLS admin console to choose which plugins to use
plugin configuration
  configures the plugins' configuration data (e.g. XKMS server's host & port)
  this configuration is used for all clients
    vs. each client storing the plugins' configuration data
  typically uses the WLS admin console to configure the plugins' persistent data
    automatically get console pages taylored to the plugin's required persistent data
      e.g. fields to enter the XKMS server's host & port generated from the plugin's configuration mbean api
  WLS CLV framework persistently stores this configuration data on behalf of the configured plugins
    sends this configuration data to the plugins at runtime via each plugin's configuration mbean api
    relieves the plugins from having to persist their configuration data
symmetrical with administering other WLS security plugins (e.g. for authentication/authorization)
client
quality of service
  does not choose which plugins to use
    the administrator does this instead
plugin configuration
  does not configure the plugins' configuration data (e.g. XKMS server & port)
    the administrator does this instead
lookup & validation criteria
  decides which of the WLS defined standard criteria for locating and validating cert paths it requires
    e.g. find cert path given the end certificdate's subject dn
uses WLS & JDK certpath apis
  never uses plugin specific proprietary apis
new plugin implementations can be installed and configured by the administrator
  don't need to reconfigure or recode clients
In one embodiment:
the plugin writer decides what configuration data it requires (e.g. XKMS server's host & port)
the plugin writer can write a configuration mBean API for getting and setting those fields.
the WLS console create customized pages for that plugin based on its mBean API (ie. fields for specifying the XKMS server's host & port)
the administrator uses these console pages to enter the plugin's configuration data (e.g. the administrator specifies the XKMS server's host & port)
WLS persists this data to a configuration file. The format of the file is based on the plugin's mBean API
WLS makes the configuration data available to the plugin via the plugin's mBean API.

The following implementation is given as a non-limiting example.

Example Implementation

This is a description of details of a certificate lookup and validation framework of one embodiment.

Figure 2:
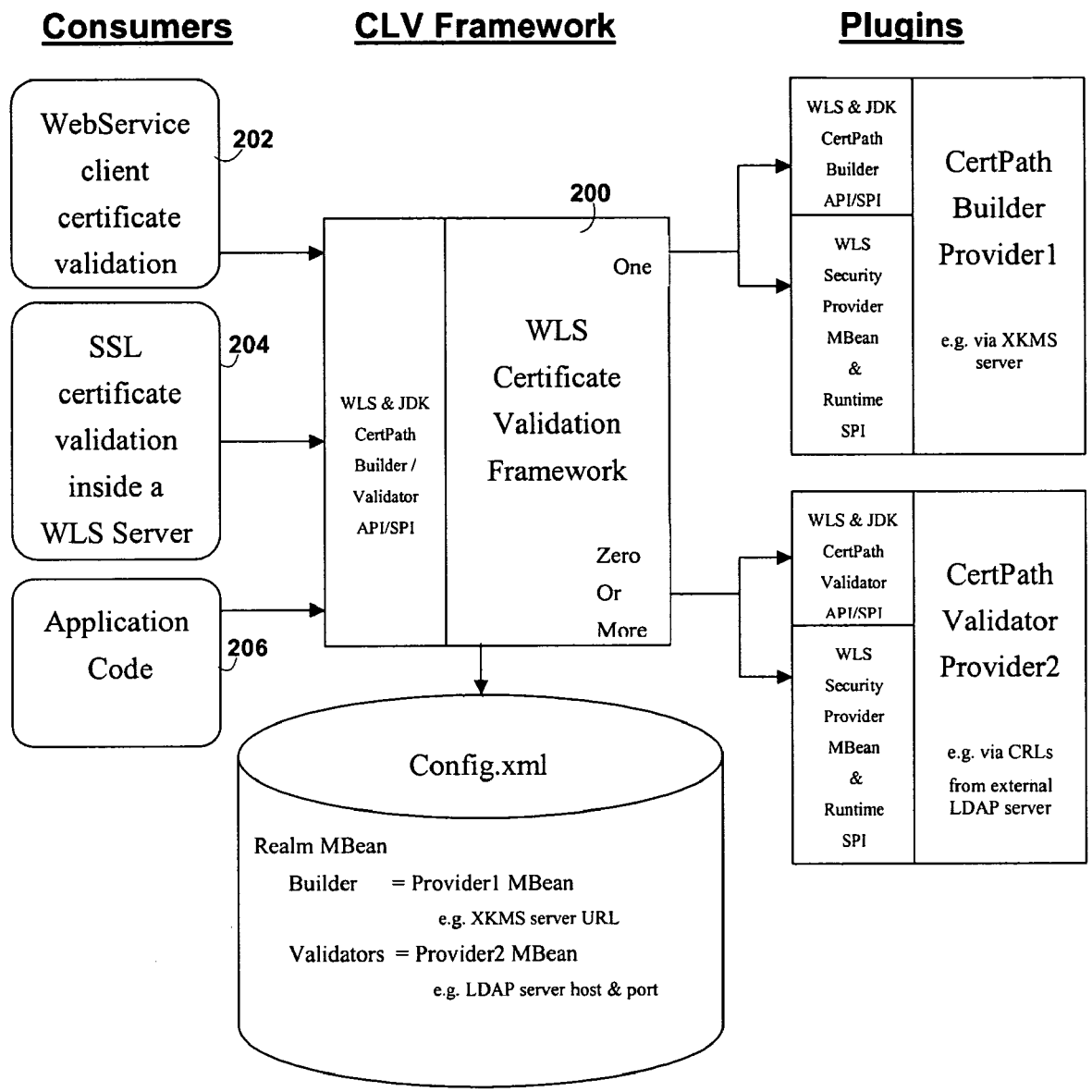
FIG. 2 is a diagram of a certificate validation framework of another embodiment of the present invention.

FIG. 2 is an example that shows a certificate lookup and validation framework 200 which is a security plug-in framework that finds and validates certificate chains such as X.509 certificate chains. It provides an API and SPI which extends JDK's CertPath API/SPI.

The framework 200 provides a security service for certificate validation and lookup for 2-way SSL or WebServices. This service consists of a simple API and is used from components that need to validate or lookup certificates (e.g., 2 way SSL).

The Certificate Lookup and Validation (CLV) framework 200 can satisfy the following consumers:

A client sends a method request to a WebService. It may sign parts of the request. If it does, the client should include its signing certificate's chain, its signing certificate or a reference to its signing certificate (e.g. subject Distinction Name (DN) in the request. Similarly, if the client wants the response to be encrypted, it includes its encryption certificate, chain or reference in the request.

Web Services can use a CLV API that validates a chain. It also can use an API that, given the certificate, or reference to the certificate, and returns a validated certificate chain.

The current draft of the OASIS WebServices security specification allows for three types of certificate references: subject DN, issuer DN plus serial number, and subject key identifier which are supported by the CLV API. The CLV framework can support other forms of certificate references. The Extensible Markup Language (XML) digital signature specification says that the client may pass a reference to its certificate so this can be supported as well.

Outbound SSL 204 and 2-way inbound Secure Sockets Layer (SSL) can receive certificate chains during the SSL handshake. The chains are either complete, or may be missing the root Certification Authority (CA) that terminates the chain.

An example of 2-way inbound SSL is a browser connecting to a webapp over the HyperText Transfer Portocol Secure (HTTPS) where the browser sends the client's certificate chain to the webapp. An example of outbound SSL is an admin server talking to the node manager over an SSL connection.

SSL contains built-in code that, given a set of trusted CAs, completes and validates the chain. Customers can perform additional validation on the chain (e.g. for revocation checking). To accomplish this, SSL can use a CLV API that takes the completed and validated chain and performs extra validation.

In one embodiment, instead of removing all built-in validation from SSL and changing SSL to rely solely on the CLV framework for validation, SSL will continue to have built-in validation and will only use the CLV framework to perform extra validation (e.g. revocation checking).

Application code 206 in the server is allowed to use the CLV API directly to lookup and/or validate certificate chains.

Lookup and Validation Security Plug-in Providers:

The CLV framework provides a certificate lookup and validation plug-in SPI to allow customers and Independent Software Vendors (ISV)s to write their own lookup and validation security providers.

In one embodiment, there are two types of CLV security providers (thus two SPIs). The first, a "CertPathBuilder", receives a certificate or certificate reference. It looks up or completes the certificate chain (if necessary) and validates it (e.g. a builder that uses an external XKMS server to lookup and validate the certificate chain).

The second, a "CertPathValidator", receives a certificate chain (e.g. from a CertPathBuilder or from SSL) and performs extra validation (e.g. a validator that uses CRLs stored in an external LDAP server to perform revocation checking).

The CLV plug-in SPI can be symmetrical with the SPI for other security provider types (e.g. Authorizers). It can allow the plug-in to have custom configuration parameters (e.g. the URL of an external XKMS server), as well as custom console pages and management operations (e.g. to manage a certificate registry).

The administrator can configure the CLV providers for a security realm using MBeans and an administration console for server software, such as the administration console of WebLogic Server™ available from BEA Systems, Inc. of San Jose Calif.

In one embodiment, a security realm has one CertPathBuilder and zero or more CertPathValidators configured.

The CLV framework can provide two public APIs as client software interfaces. The first receives a certificate or certificate reference, uses the configured CertPathBuilder plug-in to lookup and validate the corresponding certificate chain, then uses the configured CertPathValidator plug-ins to perform extra validation. WebServices, Integration software, such as the WebLogic Integration™ available from BEA Systems, Inc., of San Jose, Calif., and Portal Software, such as WebLogic Portal™ available form BEA Systems, Inc., of San Jose, Calif., can use this API. It may also be used by application code.

The second public API, based on the JDK CertPathValidator API, receives a certificate chain then uses the configured CertPathValidator plug-ins to validate the chain. SSL, WebServices, and products such as Integration software and Portal software can use this API. It may also be used by application code (e.g., application supplied SSL trust managers).

The CLV framework supplies an API that SSL, WebServices, Integrated Software, Portal Software and application code may use to lookup and validate X.509 certificate chains. This API can hide the details of the CertPathBuilders and CertPathValidators the administrator has configured.

Since the JDK provides a CertPathBuilder API for looking up certificate chains and a CertPathValidator API for validating certificate chains, the CLV framework can use these JDK APIs instead of inventing its own API.

The JDK CertPath API/SPIs do not standardize the lookup criteria for finding certification chains or the types of certificate supported or how CertPath providers get their configuration data. Therefore, the CLV framework can extend the JDK CertPath API to provide a complete lookup and validation API.

CertPathBuilder API

This API is used to lookup and validate a certificate chain. WebServices can use this API to lookup and validate client certificates.

The API can have the following input parameters:

The name of the security realm

A CertPathSelector to indicate the desired certificate chain.

An optional ContextHandler that may be used to pass additional information to the CertPathBuilder and CertPath- Validators configured for the security realm. This is symmetrical with the context handlers passed into other types of security providers.

An optional list of trusted CAs. Many CertPathBuilder and CertPathValidator providers require a list of trusted CAs (e.g. the JDK's PKIXCertPathBuilder). This allows the caller to indicate which trusted CAs should be used if trusted CAs are required. If not specified, then the default set of trusted CAs for the server will be used.

The API can support looking up a chain from the end certificate, or from the end certificate's subject DN, from the end certificate's issuer DN and serial number, from the end certificate's subject key identifier.

The API can return a chain of X.509 certificates. If the chain cannot be found or if it is not valid, then the API can throw an exception indicating the problem.

The framework uses the configured CertPathBuilder security provider to lookup and validate the chain. If found and valid, the framework then can call each configured CertPathValidator, in the order the administrator configured them, to perform extra validation on the chain. In one embodiment, the chain is only valid if the builder and all the validators successfully validate it.

The builder decides how much of the chain to return. It should at least include the chain's end certificate. For example, an XKMS CertPathProvider will return the entire chain, while the out of the box certificate registry, which allows the administrator to configure the list of valid end certificates, only returns the end certificate. This was done to fulfill a WebService requirement that the administrator be able to configure a server product, such as WebLogic Server™, to only validate that the end certificate is registered, without needing to configure all the issuer certificate authorities.

The builder also decides which types of lookup it supports. For example, the WebLogicCertPathProvider, which is based on the Certicom SSL certificate validation code, supports lookup from an end certificate but does not support lookup from a subject DN. The administrator should ensure that the configured builder supports the lookups that applications require.

In one embodiment, the API does not provide a standard mechanism for the caller to pass in additional validation criteria such as when it wants the chain to be valid or the key usage (e.g. the caller only wants WLS digital signature certificates). This was done to be symmetrical with the XKMS standard, which doesn't allow such criteria. The caller may use the X.509 Certificate API to perform these checks instead.

The API allows the caller to pass in context information. The context is passed to the builder and validators. This allows the caller and specific providers to agree on a set of extra parameters that might affect building or validation.

If a validator checks for expired certificates, it does so based on the current time (i.e. "now"). The caller may use the JDK X509Certificate API to perform extra time checking (for example, I need the certificate to be valid between Jul. 26, 2004 and Jul. 27, 2004)

A certificate issuer may include a key usage in the X509 certificate to indicate what the end certificate may be used for (e.g. DigSig signatures, DigSig encryption). The caller may use the JDK X509Certificate API to find the end certificate's key usage.

CertPathValidator API

This API is used to perform extra validation on a certificate chain. SSL, which has built-in code to complete and validate certificate chains, will use this API to perform extra validation (e.g. revocation checking) on the chain.

The API has the following input parameters:
The name of the security realm.
The X509 certificate chain to be validated
An optional ContextHandler that may be used to pass additional information to the CertPathValidatorProviders configured for the security realm. This is symmetrical with the context handles passed into other types of security providers.
An optional list of trusted CAs. Many CertPathValidator providers require a list of trusted CAs (e.g. the JDK's PKIXCertPathValidator). This allows the caller to indicate which trusted CAs should be used if trusted CAs are required. If not specified, then the default set of trusted CAs for the server will be used.

If the chain is valid, then the API just returns. If the chain is invalid, then the API throws an exception indicating the problem.

The framework performs the validation by calling each CertPathValidator security provider that the administrator configured. The validators are called in the order they are configured in the console. The certificate chain is valid if all the validators successfully validate it. Otherwise, it passes the first validation error back to the caller.

Like the CertPathBuilder API, this API does not provide a standard mechanism for the caller to pass in additional validation criteria other than a context. Again, the caller may use the JDK's X509Certificate API on the validated chain to perform extra validation. Or, the caller and the providers can agree on more specific validation parameters that will be passed via the context.

Note that SSL always performs some built-in validation before it calls this API to perform extra validation (e.g. revocation checking). SSL adds parameters to the context to indicate what validation it has already done. A CertPathValidator may use these parameters to avoid performing duplicate validation.

Certificate Lookup and Validation SPI

Customers and vendors can use this SPI and to write their own certificate lookup and validation security providers.

There are two types of providers: CertPathBuilders, which lookup and validate certificate chains, and CertPathValidators, which perform extra validation on a certificate chain.

The SPI is symmetrical with other security provider SPIs. It has three parts—an MBean SPI, a security provider SPI and a lookup/validation SPI.

The provider uses the MBean SPI to write a custom MBean. This MBean is used to configure WLS to use the provider. The MBean may contain custom configuration attributes and management operations.

The provider uses the lookup/validation SPI to write the custom lookup/validation implementation.

The provider uses the security provider SPI to write code that lets a server product create and use the provider. It bridges the gap between the MBean and the lookup/validation implementation.

Note that a provider may be both a builder and a validator. The administrator will configure whether the provider should be used as the realm's builder. When the builder API is called, if this provider is configured as the realm's builder, it will only be called as a builder, not as a validator. However, if it is not configured as the realm's builder, then it will be called as a validator. Regardless, when the validator API is called, the provider will be called as a validator.

MBean SPI

Two new SPI MBeans can be added: CertPathBuilderMBean and CertPathValidatorMBean. They have no methods or attributes. The provider, depending on its type, extends one or both. They both extend the CertPathProviderMBean. This allows a customer to write a provider that is both a builder and a validator.

The provider can hard-code their MBean's ProviderClassName to the name of their security provider implementation. This allows the WLS server to instantiate the provider at runtime.

Lookup/Validation SPI

The provider can write a JDK CertPathValidator and or JDK CertPathBuilder to do the actual lookup and validation.

The CertPathValidator receives an X509 certificate chain, a context handler and a list of trusted CAs. It either validates the chain or throws an exception that is propagated back to the caller.

The CertPathBuilder receives a CertPathSelector, a context handler and a list of trusted CAs. It either looks up and validates the corresponding X509 chain or throws an exception that is propagated back to the caller.

Builders and validators that require trusted CAs should use the ones passed in instead of their own list of trusted CAs. Builders and validators that do not require trusted CAs (e.g. a validator that does revocation checking) should ignore the trusted CAs.

The builder decides how much of the chain to return. If possible, it should return the entire completed chain. At a minimum, it must return the chain's end certificate.

The builder decides which types of CertPathSelectors it supports (i.e. what chain lookup criteria it supports). It throws an exception if it receives a type of selector that it does not support.

Security Provider SPI

The CertPathBuilder and CertPathValidator providers must implement the WLS CertPathProvider SPI.

The SPIs includes an initialize method. This CLV framework passes the provider's MBean to this method. The provider may use the MBean to access any custom configuration attributes.

The SPI also includes methods for returning the provider's JDK CertPathValidator/Builder implementations (providers should return null for the features they don't support). The CLV framework calls them (on each invoke) then uses the builder/validator to lookup and validate certificate chains.

Custom Console Pages

The console provides a mechanism for security providers to have custom configuration pages. CLV security providers may use this same mechanism.

Configuration API

The new attributes can be added to the RealMBean to store the CLV provider configuration.

The first, "CertPathProviders", stores a list of the configured CertPathBuilder/Validator providers' Mbeans, in the order they should be invoked in. The list should include at least one CertPathBuilder.

The second, "CertPathBuilder", indicates which of the realm's CertPathBuilders will be used as the builder for this realm. It must not be null—in other words, a valid realm must have a CertPathBuilder configured Typically, providers either are pure validators, or builder/validators. For example, the out of the box (OOTB) certificate registry is both a builder and a validator, while a CRL provider which does revocation checking will just be a validator. First, the customer configures the providers, based on algorithm (i.e. I want to use XKMS and the certificate registry). Then, the customer decides which of these providers should be used for looking up certificates (i.e. which provider is the builder). That is, the customer isn't focusing on the builder/validator difference since this is a subtle distinction.

One new attribute, "DebugSecurityCertPath", will be added to the ServerDebugMBean to turn on the CLV debugging. It is symmetrical with the other security debugging flags. The CLV framework and the out of the box CLV providers will use this attribute to turn on debugging. Third party CLV providers may use this attribute to turn on debugging.

Auditing API

The CLV framework adds two new auditing event interfaces. It uses them to post auditing events for lookup and validation failures. These auditing event classes are modeled after the other auditing event classes in the security framework.

The first, AuditCertPathBuilderEvent, which extends AuditEvent, adds attributes for the CertPathSelector that is used to lookup the certificate chain, the context handler and the list of trusted CAs.

The second, AuditCertPathValidatorEvent, which also extends AuditEvent, adds attributes for the CertPath (certificate chain) being validated, the context handler and the list of trusted CAs.

The CLV framework uses these auditing APIs to post audit events for lookup and validation failures. CLV providers may post audit events to provide more detailed information. Our OOTB providers will not.

The audit framework forwards these events to the audit providers configured in the realm. The audit providers may optionally handle or ignore these events. 7.0 and 8.1 audit providers can automatically receive these new audit events (vs. needing to implement an optional mix-in API to receive them).

Weblogic CertPath Provider

Functional Description

The WebLogic CertPath Provider is an out of the box security provider that completes and validates certificate chains by using the same trusted CA based checking that certicom uses.

WebServices must be able to validate client certificates using the same algorithms that Certicom uses. This provider satisfies this need.

An administrator can configure a set of trusted CAs for each server. This provider uses that set of trusted CAs to complete the certificate chain (if necessary). If the chain cannot be completed, then it is invalid.

The provider checks the signatures in the chain, ensures that the chain has not expired, and checks that one of the certificates in the chain is issued by one of the server's trusted CAs. If any of these checks fail, the chain is not valid.

Finally, the provider checks the chain's basic constraints (i.e. that a certificate that is not allowed to issue certificates doesn't). This can be turned off by today's existing SSL command line switch.

There are two common scenarios when this provider will be configured:

The administrator wants SSL and WebServices to both use the Certicom certificate validation algorithms (this is the out of the box configuration).

The administrator wants SSL and WebServices to both use the Certicom validation algorithm plus another CertPathValidator provider to do extra validation—e.g. certificate revocation checking.

Functional Requirements

This provider is both a CertPathBuilder and a CertPathValidator.

Its MBean (WeblogicCertPathProviderMBean) does not add any custom configuration attributes or management operations. It uses the trusted CAs that are passed to it (by default, the trusted CAs configured for the server). It also uses the SSL command-line switch to turn off basic constraint checking.

This provider's console page should clearly indicate that the server's trusted CAs must be configured too.

It supports the EndCertificateSelector CertPathSelector. The caller passes in the chain's end certificate. The rest of the certificate chain (CAs) must be registered in the server's trust keystore.

If necessary, this provider uses the configured trusted CAs to fill in the intermediate and root CAs.

Note, if this provider is configured as a CertPathValidator, and SSL is configured to call the CertPathValidators to do extra validation, then this provider will be called. However, this provider does the same validation as the built-in SSL validation. To prevent duplicate work, this provider looks in the context for the parameters that SSL adds to indicate what level of validation SSL has already done. If these parameters are found, then this provider will not perform any validation (since SSL has already done the work).

Dependencies

The administrator can configure the WebLogicCertPathProvider via the console.

Currently, SSL only reads the trusted CAs from the trust keystore when the server is booted. This may be changed to allow dynamic trust keystore updates. If this work is done, the WebLogicCertPathProvider must refresh its trusted CAs too.

Certificate Registry

Functional Description

The Certificate Registry is an out of the box security provider that allows the administrator to explicitly register the list of end certificates that are allowed to access the server.

The certificate registry is used to store the list of valid certificates. That is, only registered certificates are valid. This provides an inexpensive mechanism for performing revocation checking. The administrator revokes a certificate by removing it from the registry. The registry must be stored in the embedded LDAP server. Because of this, customers only need to configure it once per domain vs. configuring it once per server.

The administrator can manage the certificate registry through the console—that is, register, unregister and list certificates. The administrator registers a certificate by specifying the pathname of a file containing the end certificate.

The administrator must be able to export the certificate registry from one security realm into a file then import it to another certificate registry. The file format will be proprietary and undocumented. The administrator can export a single registration to a Privacy Enhanced Mail (PEM) or Distinguished Encoding Rules (DER) file.

The certificate registry is both a builder and a validator. The administrator may configure it as the realm's builder, in which case it used as a builder and a validator, or just as a validator. When used as a builder, it locates and validates end certificates stored in the registry. When used as a validator, it ensures that the chain's end certificate is stored in the registry.

Functional Requirements

This provider is both a CertPathBuilder and a CertPathValidator.

Its MBean (CertificateRegistryMBean) does not add any custom configuration attributes. However, it adds management methods that register, unregister and list certificates. The console uses these methods to manage the registry.

Its MBean also has methods for importing and exporting certificates. The console will use these methods too.

The certificates are stored in the embedded LDAP server. Because of this, certificates are only registered once for the security realm (vs. trusted CAs which are registered in per server trust keystores). The administrator assigns each certificate a human readable alias (similar to how JDK keystores work).

There may only be one certificate registered per subject DN.

Quality of Service

The administrator registers end certificates under aliases.

This provider only validates that the certificate is registered. It does no further validation (e.g. chain validation, expiration checking).

When configured as a CertPathBuilder, the certificate registry supports the following types of CertPathSelectors:

IssuerDNSerialNumberSelector—the caller passes in the end certificate's serial number and issuer's DN. The registry finds the corresponding end certificate.

SubjectDNSelector—the caller passes in the end certificate's subject DN. The registry finds the corresponding end certificate.

SubjectKeyIdentifierSelector—the caller passes in the end certificate's subject key identifier. The registry finds the corresponding end certificate. Since X509 certificates are not required to have a subject key identifier, only certificates containing it may be looked up by this selector.

EndCertificateSelector—the caller passes in the end certificate. The registry ensures that the end certificate has been registered.

When configured as a CertPathBuilder, it must return a certificate chain (though the API/SPI does not dictate how much of the chain it must return). Since the registry only includes the end certificate, and not the CAs, it returns an incomplete chain that only includes the end certificate and none of the CAs.

The certificate registry does not use the context handler or trusted CAs that are passed in.

Management API

The CLV framework does not include a general-purpose certificate registry management MBean SPI (analogous to UserReader/UserEditor). Therefore, CertificateRegistry's MBean will include custom management methods. The console must provide custom management pages for managing the certificate registry.

Registration

The method to register a certificate/chain takes two parameters—an alias (the name the certificate chain will be registered under) and the pathname of a PEM or DER file (relative to the admin server) that contains the end certificate.

Customers may have certificates stored in keystores that they wish to add to the registry. They can achieve this by using JDK's keytool to export the certificates to PEM or DER files then using the normal registration mechanism.

DeRegistration

The method to unregister a certificate takes one parameter—the alias the certificate was registered under. The corresponding end certificate will be unregistered.

Listing

The method to list the registry takes two parameters—an alias wildcard and the maximum number of matches to return. It returns all the aliases that match the wildcard, subject to the provided limit.

It follows the MBean NameLister pattern that is used for listing users and groups. The method returns a cursor. The caller may pass the cursor into a method to retrieve the corresponding alias. The caller may also pass the cursor into methods that advance and close the list.

A console can display the contents of the corresponding certificate. The MBean will have a method that looks up the end certificate for an alias. It returns the certificate(s) as an X509Certificate.

Lastly, the MBean will contain a method that returns whether or not an alias is registered.

Copying a Certificate to a File

The MBean includes methods to copy a single certificate to a PEM or DER file. This allows the administrator to get certificates out of the registry.

Other Embodiments

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution enviromnents/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A certificate validation framework having a client software interface for client software requesting security certificate look-up or validation through the certificate validation framework, the framework interacting with a plug-in to do security certificate look-up or validation through a plug-in interface, the certificate validation framework having access to stored plug-in specific configuration data, the certificate validation framework providing information from the client software interface and stored configuration information to the plug-in across the plug-in interface,
wherein the plug-in is a certificate path builder plug-in.

2. The certificate validation framework of claim 1, wherein the plug-in is a certificate path builder plug-in.

3. The certificate validation framework of claim 2, further comprising a certificate path validator plug-in.

4. The certificate validation framework of claim 1, wherein the client software is a web service client certificate validation.

5. The certificate validation framework of claim 1, wherein the stored plug in specific configuration data is stored in a configuration data file for a sewer product.

6. A certificate validation framework having a client software interface for client software requesting security certificate look-up or validation through the certificate validation framework, the framework interacting with a plug-in to do security certificate look-up or validation through a plug-in interface, the certificate validation framework having access to stored plug-in specific configuration data, the certificate validation framework providing information from the client software interface and stored configuration information to the plug-in across the plug-in interface, wherein the plug-in is a certificate path validator plug-in.

7. A method comprising:
receiving a security certificate look-up or validation request from client software across a client software interface to a certificate validation framework, the certificate validation framework having access to stored plug-in specific configuration data; and
using the framework to provide information from the client software interface and stored configuration information to a plug-in across a plug-in interface so as to interact with the plug-in to do security certificate look-up or validation;
wherein the plug-in is a certificate path builder plug-in.

8. The method of claim 7, wherein the stored plug-in specific configuration data includes server location information.

9. The method of claim 7, wherein the client software is a web service client certificate validation.

10. A method comprising:
receiving a security certificate look-up or validation request from client software across a client software interface to a certificate validation framework, the certificate validation framework having access to stored plug-in specific configuration data; and
using the framework to provide information from the client software interface and stored configuration information to a plug-in across a plug-in interface so as to interact with the plug-in to do security certificate look-up or validation;
wherein the plug-in is a certificate path validator plug-in.

11. A machine readable medium having instructions stored thereon that when executed by a processor cause a system to:
receive a security certificate look-up or validation request from client software across a client software interface to a certificate validation framework, the certificate validation framework having access to stored plug-in specific configuration data; and use the framework to provide information from the client software interface and stored configuration information to a plug-in across a plug-in interface so as to interact with the plug-in to do security certificate look-up or validation;

wherein the plug-in is a certificate path builder plug-in.

12. The machine readable medium of claim 11, wherein the stored plug-in specific configuration data includes server location information.

13. The machine readable medium of claim 11, wherein the client software is a web service client certificate validation.

14. The machine readable medium of claim 11, wherein the stored plug-in specific configuration data is stored in a configuration data file for a server product.

15. A machine readable medium having instructions stored thereon that when executed by a processor cause a system to:

receive a security certificate look-up or validation request from client software across a client software interface to a certificate validation framework, the certificate validation framework having access to stored plug-in specific configuration data; and use the framework to provide information from the client software interface and stored configuration information to a plug-in across a plug-in interface so as to interact with the plug-in to do security certificate look-up or validation;

wherein the plug-in is a certificate path validator plug-in.

16. The method of claim 7, further comprising a certificate path validator plug-in.

17. The machine readable medium of claim 11, further comprising a certificate path validate or plug-in.

* * * * *

UNITED STATES PATENT AND TRADEMARK OFFICE
CERTIFICATE OF CORRECTION

PATENT NO. : 7,664,948 B2 Page 1 of 1
APPLICATION NO. : 11/125576
DATED : February 16, 2010
INVENTOR(S) : Thomas O. Moreau It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 1041 days.

Delete the phrase "by 1041 days" and insert -- by 1317 days --.

In column 3, line 8, delete "specifing" and insert -- specifying --, therefor.

In column 3, line 21, delete "adminstrator" and insert -- administrator --, therefor.

In column 3, line 36, delete "adminstrator" and insert -- administrator --, therefor.

In column 3, line 45, after "the" delete "the".

In column 4, line 8, delete "use–" and insert -- use– i.e. chooses --, therefor.

In column 5, line 44, delete "portocol" and insert -- protocol --, therefor.

In column 7, line 58, after "2004)" insert -- . --.

In column 9, line 54, delete "RealMBean" and insert -- RealmMBean --, therefor.

In column 9, line 63, after "configured" insert -- . --.

In column 13, line 50, delete "enviromnents" and insert -- environments --, therefor.

In column 14, line 21, in claim 5, delete "plug in" and insert -- plug-in --, therefor.

In column 14, line 22, in claim 5, delete "sewer" and insert -- server --, therefor.

Signed and Sealed this

Fourteenth Day of September, 2010

David J. Kappos
*Director of the United States Patent and Trademark Office*